Patented June 15, 1948

2,443,455

UNITED STATES PATENT OFFICE 2,443,455

DYNAMOELECTRIC MACHINE

Clairmont J. Herman, Fort Wayne, Ind., assignor to General Electric Company, a corporation of New York Application July 25, 1947, Serial No. 763,591

11 Claims. (Cl. 171—252)

This invention relates to dynamoelectric machines and more particularly to improved core members and slot wedges for such machines.

In dynamoelectric machines, it has been found desirable to provide means for closing the winding slots of the core members after the windings are in place and for holding the windings securely in place to prevent damage to the windings from external sources and to keep the windings from working loose due to gravity, vibration, centrifugal force, etc.

It is an object of this invention to provide an improved dynamoelectric machine construction.

Another object of this invention is to provide an improved dynamoelectric machine slot wedge member.

Further objects and advantages of this invention will become apparent and the invention will be better understood from the following description referring to the accompanying drawing, and the features of novelty which characterize this invention will be pointed out with particularity in the claims annexed to and forming a part of this specification.

A feature of this invention is the provision of a plurality of slot wedges incorporated in a single unitary structure. This construction facilitates ease of assembly, reducing the time required for such assembly, and also maintains the wedges in proper relationship to prevent damage to the winding by displacement of an individual wedge.

Figure 1:
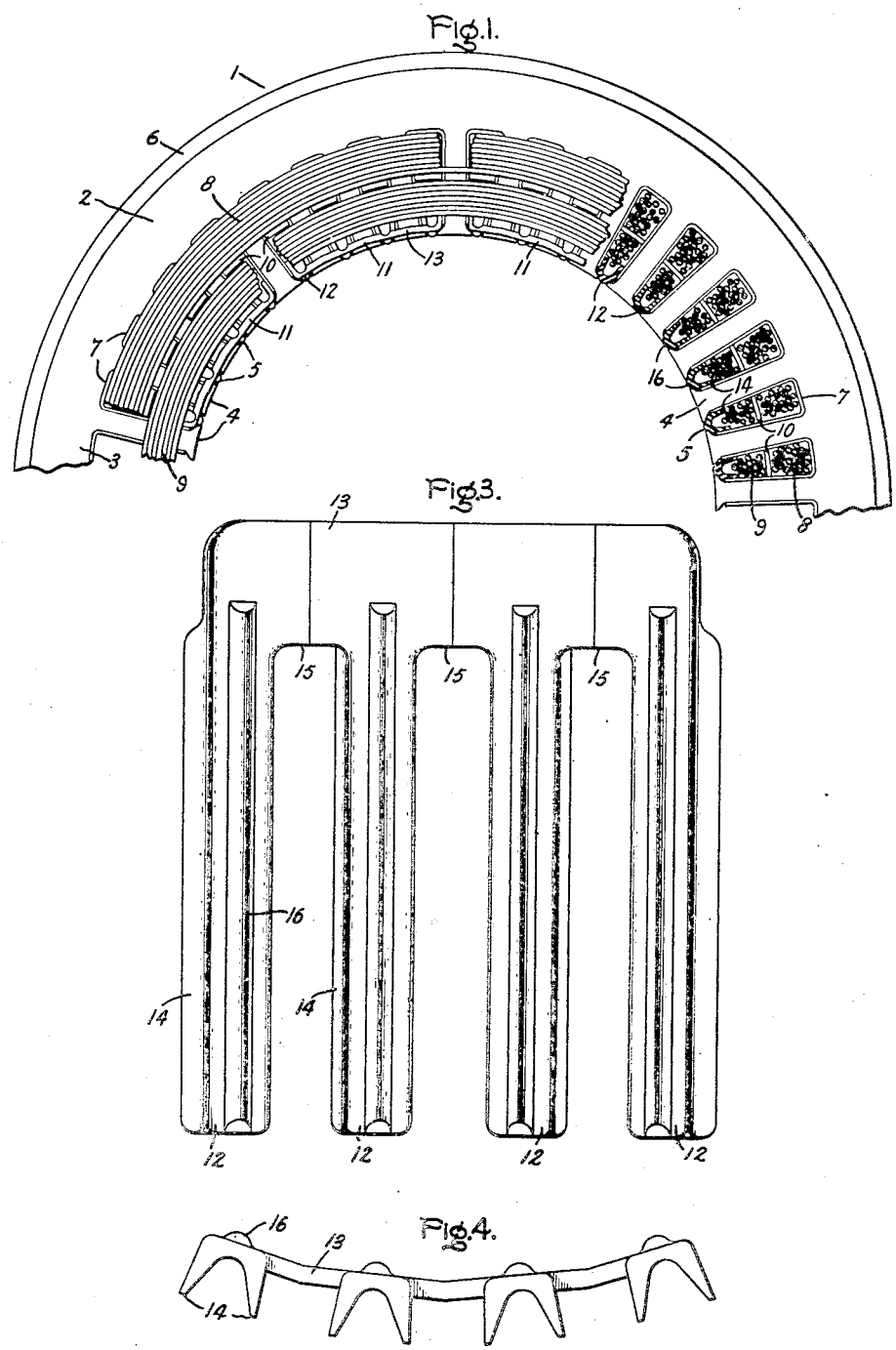
Figure 2:
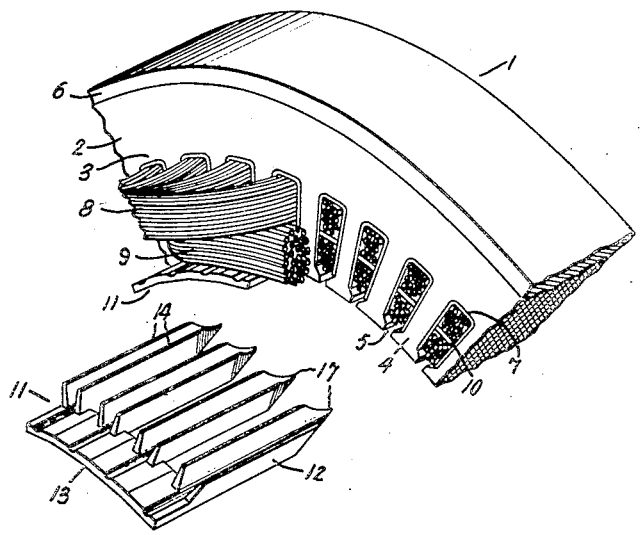

In the drawing, Fig. 1 is a side view of a stationary member of a dynamoelectric machine provided with the improved slot wedge members of this invention; Fig. 2 is a perspective view of the stator and wedge assembly of Fig. 1; Fig. 3 is a view of a slot wedge member as shown in Figs. 1 and 2; and Fig. 4 is an end view of the slot wedge member shown in Fig. 3.

Referring now to Figs. 1 and 2, there is shown a portion of a dynamoelectric machine comprising a stationary element or stator 1 having a magnetizable core 2 which may be of standard laminated construction or may be made in any other suitable form. The core 2 consists of a main or yoke portion 3 having teeth 4 extending radially inward therefrom to form a plurality of coil-winding slots 5. A supporting ring 6 forms a frame for supporting the core. The edges of this ring may be inturned so as to form abutments between which the core is supported as more fully described in, for example, Patent No. 1,812,748 to Kayser. The slots 5 are provided with liners 7 formed of insulating material such as described in Patents 2,169,097 and 2,180,983 to Hall. These slot liners are formed from an extruded strip of material having cuffed or beaded edges which abut the sides of the slots 5. In the embodiment of the invention shown in Fig. 1, the slots are shown as containing superimposed layers of turns or sides of different coils and, specifically, a layer of coil sides of insulated motor—running windings 8 and over that layer, a second layer of coil sides of insulated motor—starting windings 9, with a separator 10 therebetween. This separator preferably is formed of the same material used in slot liners 7.

In order to provide for holding the windings in place and for closing the slots 5, slot wedge members 11 are positioned in the slots 5 over the windings. Referring now to Figs. 3 and 4, there is shown the improved slot wedge member of this invention. This member is moulded of flexible insulating material, preferably of a plastic of the type including superpolyamide resins, such as the reaction product of hexamethylene diamine and adipic acid, the reaction product of hexamethylene diamine and sebacic acid, or alternatively the poly vinyl-acetals such as the reaction product of a partially hydrolyzed poly vinyl acetate and an aldehyde, such as formaldehyde, or butyraldehyde. These members are formed as a single unitary structure and are constituted of a plurality of slot wedges 12 and a transverse portion 13 joining the wedges at one end. While the wedge member is shown here as including four slot wedges 12, it will be understood that any number of such wedges can be provided. Wedge members comprising from 2 to 36 slot wedges have been utilized in the construction of motors of fractional horsepower frame sizes. However, it has been found that wedge members having from 2 to 4 slot wedges are the most satisfactory from a cost and assembly standpoint. The provision of this multiple wedge structure reduces the tendency of the individual slot wedges to twist and partially offset as they are inserted into the slots. In addition, this feature permits the insertion of a number of wedges at one time thus greatly reducing the time required for assembly of the machine.

The slot wedges 12 are formed of substantially U-shaped cross section with lips 14 forming a concave surface therebetween. As shown in Fig. 1, these lips abut the interior walls of the slots 5 and the concave surface is formed toward the winding side of the slot. The distance between the lips 14 is preferably approximately equal to or slightly greater than the available space in the slot. Therefore, the lips of the slot wedges 12 are required to flex together slightly as the wedges enter the slot. For motors of fractional horsepower frame sizes slot wedges varying in overall length from approximately 1" to about 5" have been used depending on the thickness of the stator punchings. For a slot wedge length of 1 and 1/16", a satisfactory width across lips 14 was found to be 3/16" with the depth of the slot wedge approximately the same. The friction of the wedges against the walls of the slots holds the wedges securely in place, regardless of vibration, gravity, and centrifugal force. Thus the wedges firmly hold the windings in the slots and individual wires cannot creep past the wedges into the air gap of the machine.

The transverse portions 13 of the wedge member 11 are curved to conform to the curvature of the stationary member and in assembly are substantially abutting to form a substantial annulus around the core adjacent the slots, as shown in Fig. 2. When the wedge member 11 is inserted in the slots 5, the inner edge 15 of the transverse portion 13 seats against the cuffed or beaded edges of the slot insulation, or against stator end punching insulation in cases where such insulation is used. Ridges 16 are moulded integrally with the slot wedges 12 and, as shown in Fig. 1, substantially close the slot opening at the air gap surface of the stator. This feature facilitates the ease of insertion of the wedge member and stiffens the wedges against deformation when it is being pushed into place in the stator. The ridges may be omitted where experience with a particular plastic indicates that the wedge strength without ridges is adequate. The teeth 12 may have a substantially square end as shown in Fig. 3 or may have an elongated or pointed tip as shown by 17 in Fig. 2.

While the embodiment above described is shown in the drawing as applied to the stationary or stator member of a dynamoelectric machine, it will be apparent that this slot wedge construction can be applied equally as effectively on the rotor member.

It will now be readily understood that due to their concave cross section, the slot wedge elements 12 occupy a minimum of slot space and thus leave a maximum of usable space for the windings. The pressure of the windings against the deeply concave surface of the wedges tends to spread the lips 14 causing the wedges to tighten in place thus further reducing the possibility that the individual wires will creep past the wedges. It will be apparent that this improved construction not only effectively prevents injury to the windings from external sources but also prevents the windings from working loose and creeping into the air gap due to gravity, vibration or centrifugal force. The provision of a plurality of slot wedges in a single unitary structure greatly facilitates assembly, and since the wedge elements 12 are maintained in proper relationship, damage to the windings when the wedge is inserted due to displacement of the individual wedge elements is prevented.

While I have illustrated and described one embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of my invention.

What I claim as new and desire to secure by Letters Patent of the United States is:

1. A member for a dynamoelectric machine comprising a core having a plurality of coil winding slots formed therein, and means including a plurality of slot wedges extending into said slots over said windings for closing said slots and retaining said windings in place, said slot wedges being joined at one end to form a unitary structure.

2. A slot wedge member for closing winding slots and holding windings in place in dynamoelectric machines, comprising a plurality of slot wedges extending into said slots over said windings and a transversely extending portion joining said slot wedges at one end.

3. A dynamoelectric machine having a member comprising a core provided with a plurality of coil winding slots, and means for closing said slots and holding said windings in place, said means including a plurality of slot wedge fingers extending into said slots over said windings and a portion joining said fingers at one end to form a unitary structure.

4. A dynamoelectric machine having a member comprising a core with coil-winding slots formed therein, and means including a plurality of slot wedge members for closing said slots and holding said windings in place, said members comprising a plurality of slot wedges extending into said slots over said windings and a portion joining said slot wedge at one end and in substantially abutting relationship with said core.

5. A member for dynamoelectric machines having a core provided with a plurality of slots adapted to receive coil windings, and means including a plurality of slot wedge members for closing said slots and holding said windings in place, said members comprising a plurality of slot wedges extending into said slots over said windings and a transversely extending portion joining said slot wedges at one end and in substantially abutting relationship with said core, said transverse portions of said slot wedge members being in substantially abutting relationship to provide a substantially continuous annulus about adjacent said slots.

6. A member for dynamoelectric machines having a core provided with a plurality of slots adapted to receive coil windings, and means including a plurality of insulating slot wedge members for closing said slots and holding said windings in place, said members comprising a plurality of slot wedges formed with a substantially U-shaped cross-section extending into said slots over said windings and a transversely extending portion joining said slot wedges at one end, said transverse portions of said slot wedge members being in substantially abutting relationship to provide a substantially continuous annulus about said core adjacent said slots.

7. A member for dynamoelectric machines comprising a core provided with a plurality of coil-winding slots, and means including a plurality of slot wedge members for closing said slots and holding said windings in place, said member comprising a plurality of slot wedges formed of insulating material with a substantially U-shaped cross-section extending into said slots over said windings and a transversely extending portion joining said slot wedges at one end.

8. An insulating slot wedge member for closing core winding slots and holding windings in place in dynamoelectric machines, comprising a plurality of slot wedges formed with a substantially U-shaped cross-section extending into said slots over said windings and a transversely extending portion joining said slot wedges at one end, said transverse portions of said slot wedge members being in substantially abutting relationship to provide a substantially continuous annulus about said core adjacent said slots.

9. A cylindrical member for dynamoelectric machines comprising a core provided with a plurality of coil-winding slots, and a plurality of slot wedge members for closing said slots and holding said windings in place, said members comprising a plurality of slot wedges formed with a substantially U-shaped cross section extending into said slots over said windings and a transversely extending portion joining said slot wedges at one end, said transverse portions of said slot wedge members being curved to conform to the curvature of said member and arranged in substantially abutting relationship to provide a substantially continuous annulus about said core adjacent said slots.

10. A member for dynamoelectric machines comprising a core provided with a plurality of coil-winding slots, and a plurality of slot wedge members for closing said slots and holding said windings in place, said members comprising a plurality of slot wedges extending into said slots over said windings and a transversely extending portion joining said slot wedges at one end, said slot wedges being formed with lips abutting the walls of said slots, said lips forming a concave surface therebetween on the side of said slot wedges adjacent said windings.

11. A member for dynamoelectric machines comprising a core provided with a plurality of coil-winding slots, and means including a plurality of unitary molded slot wedge members formed of insulating material, said members comprising a plurality of slot wedges formed of substantially U-shaped cross-section extending into said slots over said windings and a transversely extending portion joining said slot wedges at one end.

CLAIRMONT J. HERMAN.